US009015457B2

(12) United States Patent
Nadon et al.

(10) Patent No.: US 9,015,457 B2
(45) Date of Patent: Apr. 21, 2015

(54) SYSTEM AND METHOD FOR CONFIGURING AN INFORMATION HANDLING SYSTEM BY IMPLEMENTING A CUSTOMIZED CONFIGURATION OF A PERSONALITY MODULE

(75) Inventors: Robert G. Nadon, Round Rock, TX (US); Donald W. Gerhart, Salado, TX (US); Philip Brisky, Manchaca, TX (US)

(73) Assignee: Dell Products L.P., Round Rock, TX (US)

( * ) Notice: Subject to any disclaimer, the term of this patent is extended or adjusted under 35 U.S.C. 154(b) by 431 days.

(21) Appl. No.: 13/287,755

(22) Filed: Nov. 2, 2011

(65) Prior Publication Data

US 2013/0111197 A1    May 2, 2013

(51) Int. Cl.
G06F 9/00 (2006.01)
G06F 9/24 (2006.01)
G06F 15/177 (2006.01)
G06F 9/445 (2006.01)
G06F 9/44 (2006.01)

(52) U.S. Cl.
CPC ............... *G06F 8/60* (2013.01); *G06F 9/4443* (2013.01)

(58) Field of Classification Search
CPC . G06F 9/4401; G06F 9/4411; G06F 9/44505; G06F 1/24; G06F 15/177
See application file for complete search history.

(56) References Cited

U.S. PATENT DOCUMENTS

| 5,257,163 | A |   | 10/1993 | Buist et al. ............... 361/729 |
| 5,657,448 | A | * | 8/1997  | Wadsworth et al. ......... 709/220 |
| 6,615,123 | B2 |   | 9/2003  | Morehouse .................... 701/49 |
| 7,594,073 | B2 | * | 9/2009  | Hanebutte et al. ........... 711/113 |
| 7,698,547 | B1 |   | 4/2010  | Polyudov ........................ 713/2 |
| 2002/0116665 | A1 |   | 8/2002 | Pickover et al. ................ 714/38 |
| 2003/0005176 | A1 | * | 1/2003 | Dubal ........................... 709/327 |
| 2003/0110241 | A1 |   | 6/2003 | Cheng ........................... 709/221 |
| 2004/0111597 | A1 |   | 6/2004 | Rothman et al. ................. 713/1 |
| 2004/0215951 | A1 | * | 10/2004 | Chen et al. ....................... 713/1 |
| 2005/0050320 | A1 | * | 3/2005 | Wassmann et al. ........... 713/165 |
| 2005/0071385 | A1 |   | 3/2005 | Rao ................................ 707/200 |
| 2005/0204125 | A1 |   | 9/2005 | Chin .............................. 713/100 |
| 2006/0184927 | A1 |   | 8/2006 | Deblaquiere et al. ......... 717/168 |
| 2006/0199613 | A1 |   | 9/2006 | Almgren ....................... 455/558 |
| 2006/0265580 | A1 | * | 11/2006 | Dennis et al. ..................... 713/1 |
| 2007/0130484 | A1 | * | 6/2007 | Martinez et al. .............. 713/300 |
| 2008/0005733 | A1 |   | 1/2008 | Ramachandran et al. .... 717/168 |
| 2008/0081609 | A1 |   | 4/2008 | Burgan et al. ................. 455/425 |

(Continued)

OTHER PUBLICATIONS

U. S. Appl. No. 13/157,714; Inventors: Brundridge et al.; pp. 28, Jun. 10, 2011.

(Continued)

*Primary Examiner* — Thomas Lee
*Assistant Examiner* — Lin Lin Htay
(74) *Attorney, Agent, or Firm* — Baker Botts L.L.P.

(57) ABSTRACT

In accordance with embodiments of the present disclosure a method of configuring an information handling system comprises configuring a base platform of an information handling system. The method further comprises installing a personality module on the base platform. The personality module is configured to store personality information associated with an information handling resource of the information handling system. The method additionally comprises executing the personality module and installing software associated with the information handling system after executing the personality module.

19 Claims, 6 Drawing Sheets

(56) References Cited

U.S. PATENT DOCUMENTS

| | | | |
|---|---|---|---|
| 2008/0270779 A1 | 10/2008 | Wilson | 713/1 |
| 2008/0280588 A1 | 11/2008 | Roundtree et al. | 455/405 |
| 2009/0075639 A1 | 3/2009 | Bloebaum et al. | 455/418 |
| 2009/0163182 A1 | 6/2009 | Gatti et al. | 455/414 |
| 2010/0011197 A1* | 1/2010 | Harmer | 713/1 |
| 2010/0262863 A1 | 10/2010 | Hess | 714/32 |
| 2011/0029766 A1* | 2/2011 | Sever et al. | 713/2 |

OTHER PUBLICATIONS

U.S. Appl. No. 13/174,407; Inventors: Khosrowpour et al.; pp. 30, Jun. 30, 2011.

* cited by examiner

FIG. 5A

| DISPLAY NAME | STANDARD FACTORY INSTALL ALLOWED? | CUSTOMIZED INSTALL REQUIRED? |
|---|---|---|
| SYSTEM SETUP MAIN MENU | | |
| SYSTEM INFORMATION | YES | NO |
| MEMORY SETTINGS | YES | NO |
| PROCESSOR SETTINGS | YES | NO |
| SATA SETTINGS | YES | NO |
| BOOT SETTINGS | YES | NO |
| INTEGRATED DEVICES | YES | NO |
| SERIAL COMMUNICATION | YES | NO |
| EMBEDDED SERVER | YES | NO |
| SYSTEM PROFILE SETTINGS | YES | NO |
| SYSTEM SECURITY | YES | NO |
| MISCELLANEOUS SETTINGS | YES | NO |
| SYSTEM INFORMATION | | |
| SYSTEM INFORMATION | YES | NO |
| SYSTEM MODEL NAME | YES | NO |
| SYSTEM BIOS VERSION | YES | NO |
| SYSTEM SERVICE TAG | YES | NO |
| SYSTEM MANUFACTURER | YES | NO |
| SYSTEM MANUFACTURER | YES | NO |
| SATA SETTINGS | | |
| SATA SETTINGS | YES | NO |
| EMBEDDED SATA | YES | NO |
| PORT A | YES | NO |
| MODEL | YES | NO |
| DRIVE TYPE | YES | NO |
| CAPACITY | YES | NO |
| PORT B | YES | NO |
| MODEL | YES | NO |
| DRIVE TYPE | YES | NO |
| CAPACITY | YES | NO |
| PORT C | YES | NO |
| MODEL | YES | NO |

FROM FIG. 5A

| | | |
|---|---|---|
| ⋮ | ⋮ | ⋮ |
| DRIVE TYPE | YES | NO |
| CAPACITY | YES | NO |
| PORT D | YES | NO |
| MODEL | YES | NO |
| DRIVE TYPE | YES | NO |
| CAPACITY | YES | NO |
| PORT E | YES | NO |
| MODEL | YES | NO |
| DRIVE TYPE | YES | NO |
| CAPACITY | YES | NO |
| PORT F | YES | NO |
| MODEL | YES | NO |
| DRIVE TYPE | YES | NO |
| CAPACITY | YES | NO |
| eSATA | YES | NO |
| MODEL | YES | NO |
| DRIVE TYPE | YES | NO |
| CAPACITY | YES | NO |
| BOOT SETTINGS | | |
| BOOT SETTINGS | YES | NO |
| BOOT MODE | NO | YES |
| BOOT SEQUENCE RETRY | YES | NO |
| BIOS BOOT SETTINGS | SOME | SOME |
| UEFI BOOT SETTINGS | YES | NO |
| ONE-TIME-BOOT | SOME | SOME |
| BIOS BOOT SETTINGS | | |
| BIOS BOOT SETTINGS | NO | YES |
| BOOT SEQUENCE | NO | YES |
| BOOT OPTION SETTINGS | YES | NO |
| HARD DISK DRIVE | NO | YES |
| BOOT OPTION SETTINGS | | |
| BOOT OPTION SETTINGS | YES | NO |
| SAME AS THE ValueDisplayName OF | YES | NO |
| ⋮ | ⋮ | ⋮ |

| | FROM FIG. 5B | |
|---|---|---|
| ... | ... | ... |
| UEFI BOOT SETTINGS | | |
| UEFI BOOT SETTINGS | YES | NO |
| UEFI BOOT SEQUENCE | YES | NO |
| UEFI BOOT OPTION | YES | NO |
| UEFI BOOT OPTION SETTINGS | | |
| UEFI BOOT OPTION | YES | NO |
| SAME AS THE VALUE DISPLAY NAME OF | YES | NO |
| ONE-TIME BOOT | YES | NO |
| ONE-TIME BOOT | YES | NO |
| ONE-TIME BOOT DEVICE | NO | YES |
| BIOS BOOT SEQUENCE | NO | YES |
| BIOS HARD-DISK DRIVE | NO | YES |
| UEFI BOOT SEQUENCE | YES | NO |
| CUSTOM BOOT STRING | YES | NO |
| INTEGRATED DEVICES | | |
| INTEGRATED DEVICES | YES | NO |
| INTEGRATED SAS | YES | NO |
| INTEGRATED RAID | YES | NO |
| USER ACCESSIBLE USB | YES | NO |
| INTERNAL USB PORT | YES | NO |
| INTERNAL SD CARD PORT | YES | NO |
| INTERNAL SD CARD | YES | NO |
| INTEGRATED NETWORK | NO | YES |
| INTEGRATED NETWORK | YES | NO |
| EMBEDDED NIC 1 AND | YES | NO |
| EMBEDDED Gb NIC1 | YES | NO |
| EMBEDDED Gb NIC2 | YES | NO |
| EMBEDDED NIC3 AND | YES | NO |
| EMBEDDED Gb NIC3 | YES | NO |
| EMBEDDED Gb NIC4 | YES | NO |
| OS WATCHDOG TIMER | YES | NO |
| I/OAT DMA ENGINE | YES | NO |
| EMBEDDED VIDEO | YES | NO |
| SR-IOV GLOBAL ENABLE | YES | NO |
| SLOT DISABLEMENT | YES | NO |

SYSTEM AND METHOD FOR CONFIGURING AN INFORMATION HANDLING SYSTEM BY IMPLEMENTING A CUSTOMIZED CONFIGURATION OF A PERSONALITY MODULE

RELATED APPLICATION

This application is related to co-pending patent application Ser. No. 13/174,407 filed Jun. 30, 2011, and entitled "System and Method for Customized Configuration of Information Handling Systems."

TECHNICAL FIELD

The present disclosure relates in general to information handling systems, and more particularly to enablement of implementing a customized configuration of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Oftentimes, various components of an information handling system may be "branded" with an identity of the manufacturer and/or seller of the information handling system such that when such components execute on an information handling system, such components may display to a display device associated with an information handling system a graphic or alphanumeric indication of the identity of the manufacturer and/or seller (e.g., a name, a mark, a logo, etc.).

Typically, a manufacturer may brand various components with its own identity. However, in some instances, a manufacturer may be a different entity than the seller, and a seller may desire to brand components of the information handling system with its own identity, rather than the identity of the manufacturer. Accordingly, the various components must be altered to remove the manufacturer's identity and add the seller's identity. Traditionally, this requires alteration of each component as initially installed on the information handling system, and alteration of each component each time the component is updated to a new version or revision (e.g., a firmware upgrade, BIOS upgrade, etc.). Such alterations may prove time consuming, expensive, and/or prone to error.

In addition to branding, a seller may also desire to customize portions of components other than branding. Such vendor-specific customizations may also require alteration of each component as initially installed on the information handling system, and alteration of each component each time the component is updated to a new version or revision (e.g., a firmware upgrade, BIOS upgrade, etc.), which may also prove time consuming, expensive, and/or prone to error.

SUMMARY

In accordance with the teachings of the present disclosure, the disadvantages and problems associated with vendor-specific customizations to information handling resources of an information handling system have been reduced or eliminated.

In accordance with embodiments of the present disclosure a method of configuring an information handling system comprises configuring a base platform of an information handling system. The method further comprises installing a personality module on the base platform. The personality module is configured to store personality information associated with an information handling resource of the information handling system. The method additionally comprises executing the personality module and installing software associated with the information handling system after executing the personality module.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
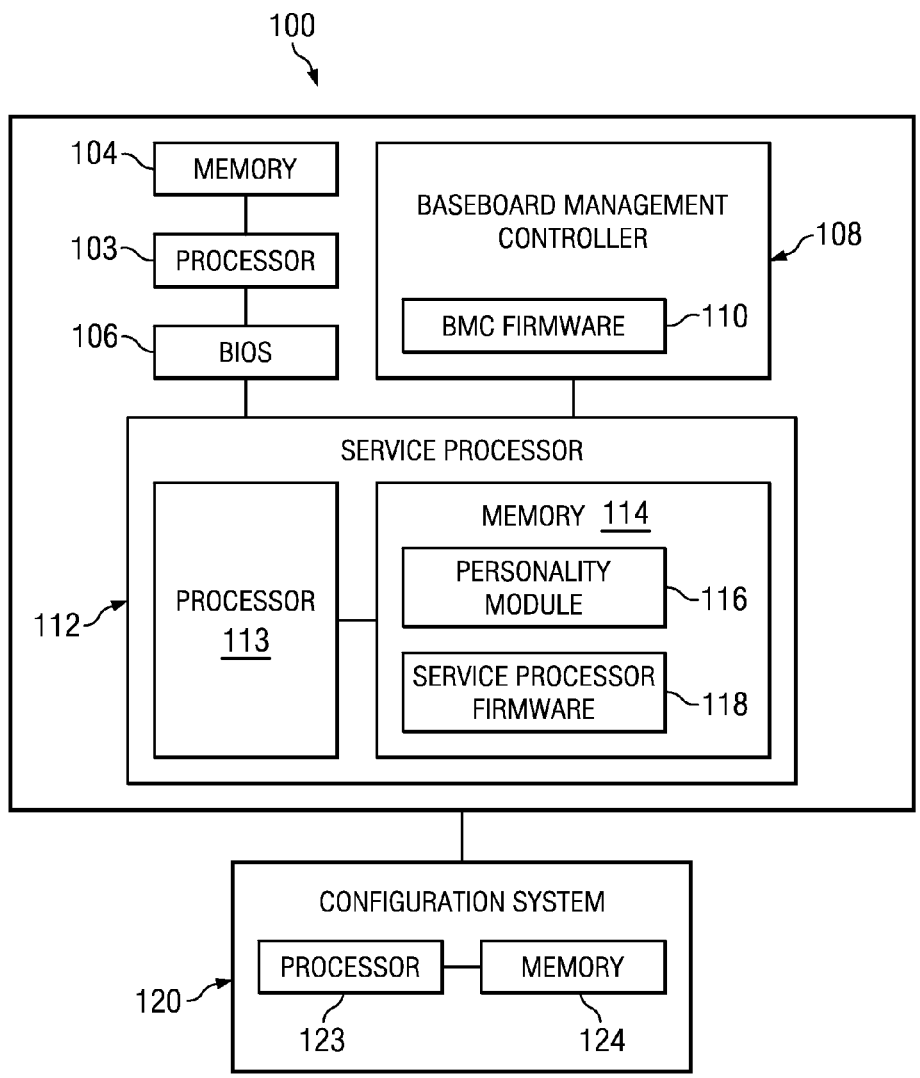
FIG. 1 illustrates a block diagram of an example information handling system, in accordance with embodiments of the present disclosure.

Preferred embodiments and their advantages are best understood by reference to FIGS. 1-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, input-output devices and/or interfaces, storage resources, network interfaces, motherboards, peripherals, firmware, and/or any other components and/or elements of an information handling system.

Throughout this disclosure, references are made to "configuration" or "configuring" information handling systems. In this disclosure "configuration" and "configuring" may broadly refer to any establishment, setting, and/or modification of parameters affecting the operation, functionality, and/or behavior of an information handling system and/or any of its internal and/or external components. For example, and without limitation, "configuration" may include establishment, setting, and/or modification of parameters affecting initialization of an information handling system. As another example, and without limitation, "configuration" may include introduction, modification, and/or replacement of executable instructions relating to one or more components of an information handling system affecting operation, functionality, and/or behavior.

FIG. 1 illustrates a block diagram of an example information handling system 100, in accordance with certain embodiments of the present disclosure. In certain embodiments, information handling system 100 may be a server. In another embodiment, information handling system 100 may be a personal computer (e.g., a desktop computer or a portable computer). As depicted in FIG. 1, information handling system 100 may include a processor 103, a memory 104 communicatively coupled to processor 103, basic input/output system (BIOS) 106 communicatively coupled to processor 103, a baseband management controller communicatively coupled to processor 103, and a service processor 112 coupled to processor 103, BIOS 106, and/or baseband management controller 108. In addition, information handling system 100 may include information handling resources other than those depicted in FIG. 1.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 100.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

BIOS 106 may be communicatively coupled to processor 103 and may include any system, device, or apparatus configured to identify, test, and/or initialize information handling resources of information handling system 100. In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 100 is booted and/or powered on. As part of its initialization functionality, BIOS code may be configured to set components of information handling system 100 into a known state, so that one or more applications 110 (e.g., an operating system or other application programs) stored on compatible media (e.g., memory 104) may be executed by processor 103 and given control of information handling system 100. In addition, BIOS 106 may be configured to communicate with service processor 112 to read and apply information stored in personality module 116, as described in greater detail below.

Baseboard management controller 108 may include any system, device, or apparatus configured to allow system administrators to manage information handling system 100 and/or monitor its operation and operation of its various information handling resources. Baseboard management controller 108 include, for example, a microcontroller embedded on a motherboard of information handling system 100 configured to manage an interface between system management software executing on information handling system 100 and information handling resources of information handling system 100. In certain embodiments, baseboard management controller 108 may be configured to provide an Intelligent Platform Management Interface (IPMI). In addition, baseboard management controller 108 may be configured to communicate with service processor 112 to read and apply information stored in personality module 116, as described in greater detail below. As shown in FIG. 1, baseboard management controller 108 may include BMC firmware 110. BMC firmware 110 may include executable instructions that govern the operation of baseboard management controller 108.

Service processor 112 may be communicatively coupled to processor 103, BIOS 106, baseboard management controller 108, and/or other information handling resources of information handling system 100 and may include any system, device, or apparatus configured to permit an administrator or other person to remotely monitor and/or remotely manage information handling system 100 (e.g., via an information handling system remotely connected to information handling system 100 via a network) regardless of whether information handling system 100 is powered on and/or has an operating system installed thereon. In certain embodiments, service processor 112 may allow for "out-of-band" control of information handling system 100, such that communications to and from service processor 112 are communicated via a management channel physically isolated from an "in band" communication channel for non-management traffic associated with information handling system 100. Thus, for example, if a failure occurs in information handling system 100 that prevents an administrator from remotely accessing information handling system 100 via its traditional network interface (e.g., operating system failure, power failure, etc.), the administrator may still be able to monitor and/or manage the information handling system 100 (e.g., to diagnose problems that may have caused failure) via service processor 112. In the same or alternative embodiments, service processor 112 may allow an administrator to remotely manage one or parameters associated with operation of information handling system 100 (e.g., power usage, processor allocation, memory allocation, security privileges, etc.). In certain embodiments, service processor 112 may include or may be an integral part of an access controller, Dell Remote Access Controller (DRAC) or an Integrated Dell Remote Access Controller (iDRAC). In addition, service processor firmware 118 may be configured to communicate with service processor 112 to read and apply information stored in personality module 116, as described in greater detail below.

As depicted in FIG. 1, service processor 112 may include a processor 113 and a memory 114 communicatively coupled to processor 113. Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 100. In some embodiments, processor 113 may be similar to processor 103. In other embodiments, processor 113 may be configured specifically for operation with service processor 112.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off. In certain embodiments, memory 114 may store service processor firmware 118—firmware that includes executable instructions to govern operation of service processor 112.

In addition, as depicted in FIG. 1, memory 114 may have stored thereon a personality module 116. Personality module 116 may include vendor-specific information for BIOS 106, BMC firmware 110, service processor firmware 118, and/or other information handling resources of information handling system 100. For example, as is described in greater detail below, personality module 116 may include delta information for one or more information handling resources, such delta information including vendor-specific customizations to manufacturer-specific configurations of information handling resources. As a specific example, such delta information may include vendor-specific branding information, which may be used to overwrite manufacturer-specific branding information, such that vendor-specific identity is displayed to a display device associated with information handling system 100 when one or more information handling resources execute on information handling system 100.

Figure 2:
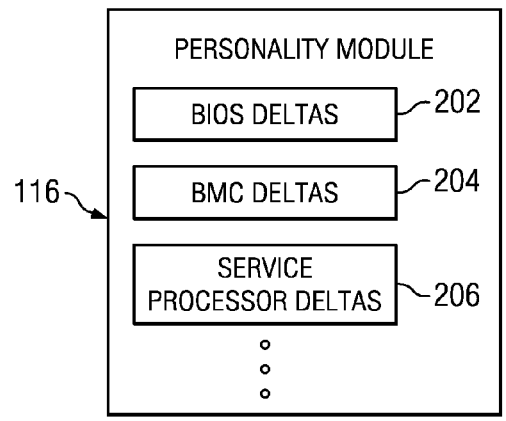
FIG. 2 illustrates a block diagram of an example personality module, in accordance with embodiments of the present disclosure.

FIG. 2 illustrates a block diagram of an example personality module 116, in accordance with embodiments of the present disclosure. As shown in FIG. 2, personality module 116 may include vendor-specific delta information associated with one or more information handling resources of information handling system 100. For example, personality module 116 may include BIOS delta information 202, BMC delta information 204, service processor delta information 206, and/or other delta information for other information handling resources of information handling system 100. BIOS delta information 202 may include vendor-specific customizations (e.g., branding information) to manufacturer-specific configurations of BIOS 106. Similarly, BMC delta information 204 may include vendor-specific customizations (e.g., branding information) to manufacturer-specific configurations of baseboard management controller 108 and/or BMC firmware 110. In addition, service processor delta information 206 may include vendor-specific customizations (e.g., branding information) to manufacturer-specific configurations of service processor 112 and/or service processor firmware 118.

Prior to delivery of information handling system 100 to an intended end user manufacturer or vendor may pre-install personality module 116 upon service processor 112 (as described in greater detail below with respect to FIGS. 4-6). In some embodiments, a configuration system 120 of the manufacturer or vendor may be communicatively coupled to information handling system 100 and may be configured to pre-install personality module 116 and one or more information handling resources upon information handling system 100. In the same or alternative embodiments, configuration system 120 may be configured to generate personality module 116 and/or determine whether information handling system 100 may be associated with a standard factory installation process or a customized installation process based on changes made to information handling system 100 by personality module 116, as described in detail below.

Configuration system 120 may comprise an information handling system that includes a processor 123 configured to execute instructions stored on memory 124 of configuration system 120. Those instructions may include instructions for creating personality module 116, determining an installation process (e.g., standard or customized) associated with information handling system 100 and/or one or more other information handling resources (e.g., personality module 116) on information handling system 100, as described in further detail below. Although depicted as a single unit in FIG. 1, it is understood that any number of configuration systems 120 may be used to perform any number of the functions of configuration system 120.

Each of one or more information handling resources (e.g., BIOS 106, baseboard management controller 108, BMC firmware 110, service processor 112, service processor 118, and/or others) may be configured to, upon initialization (e.g., at a start-up, power-on, and/or boot of information handling system 100), determine whether associated personality information associated with the particular information handling resource exists upon personality module 116. If such associated personality information exists for the particular information handling resource, the particular information handling resource may apply the associated personality information by modifying itself or another information handling resource to include the personality information. For example, if baseboard management controller 108 determines that associated personality information exists, and the personality information includes vendor-specific branding information, the baseboard management controller may modify itself or its associated BMC firmware 110 such that vendor-specific branding information may be displayed to a display device during execution of baseboard management controller 108, rather than display of manufacturer-specific branding information.

In some embodiments, in modifying itself, or another information handling resource, to apply personality information, an information handling resource may "permanently" modify itself or the other information handling resource with the applied personality information. In such embodiments, the information handling resource may, in future boot sessions, only apply associated personality information from personality module 116 if it determines that the associated personality information is more current than that presently applied. In other embodiments, the modification may only be applied for the present boot session, such that an information handling resources may apply associated personality information from personality module 116 in subsequent boot sessions.

Figure 3:
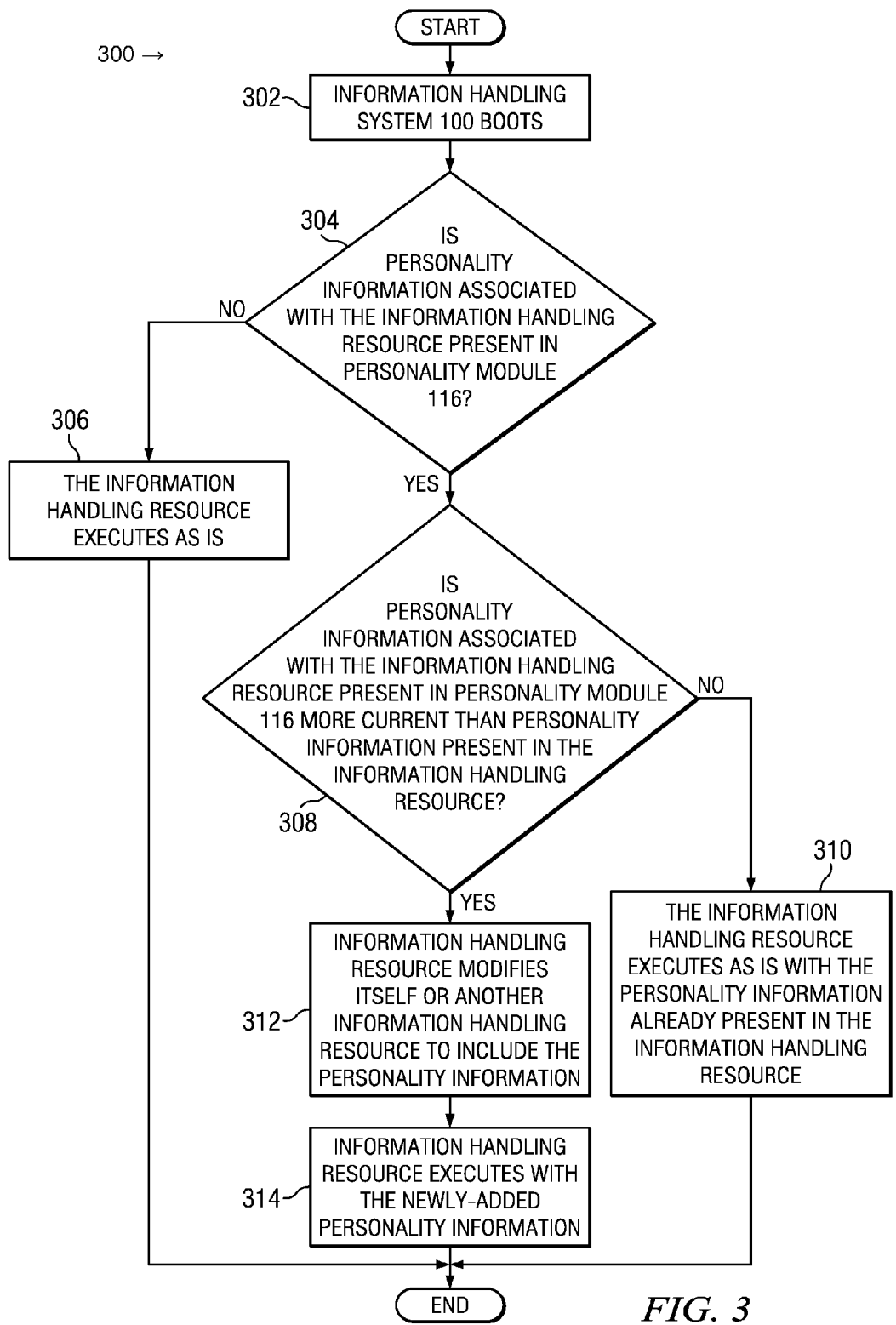
FIG. 3 illustrates a flow chart of an example method for vendor-specific customization of information handling resources of an information handling system, in accordance with embodiments of the present disclosure.

FIG. 3 illustrates a flow chart of an example method 300 for vendor-specific customization of information handling resources of an information handling system, in accordance with embodiments of the present disclosure. According to one embodiment, method 300 may begin at step 302. As noted above, teachings of the present disclosure may be implemented in a variety of configurations of information handling system 100. As such, the preferred initialization point for method 300 and the order of the steps 302-314 comprising method 300 may depend on the implementation chosen.

At step 302, information handling system 100 may boot. At step 304, an information handling resource of information handling system 100 (e.g., BIOS 106, baseboard management controller 108, BMC firmware 110, service processor 112, service processor 118, or another information handling resource) may determine if personality information associated with the information handling resource is present in personality module 116. If personality information associated with the information handling resource is present, method 300 may proceed to step 308. Otherwise, if personality information associated with the information handling resource is not present in personality module 116, method 300 may proceed to step 306.

At step 306, in response to a determination that personality information associated with the information handling resource is not present in personality module 116, the information handling resource may execute as is. After completion of step 306, method 300 may end.

At step 308, in response to determining that personality information associated with the information handling resource is present in personality module 116, the information handling resource may determine if the personality information associated with the information handling resource present in personality module 116 is more current than personality information present in the information handling resource. If the personality information associated with the information handling resource present in personality module 116 is more current than personality information present in the information handling resource, method 300 may proceed to step 312. If the personality information associated with the information handling resource present in personality module 116 is less current than personality information present in the information handling resource, method 300 may proceed to step 310.

At step 310, in response to determining that the personality information associated with the information handling resource present in personality module 116 is less current than personality information already present in the information handling resource the information handling resource may execute as is with the personality information already present in the information handling resource.

At step 312, in response to determining that personality information associated with the information handling resource present in personality module 116 is more current than personality information present in the information handling resource, the information handling resource may modify itself or another information handling resource to include the personality information.

At step 314, the information handling resource may execute with the newly-added personality information. After completion of step 314, method 300 may end.

Although FIG. 3 discloses a particular number of steps to be taken with respect to method 300, method 300 may be executed with greater or lesser steps than those depicted in FIG. 3. For example, in some embodiments personality information associated with an information handling resource may not be stored in the information handling resource across multiple boot sessions, meaning that the information handling resource may find and apply personality information for each boot session. In such embodiments, steps 308 and 310 may not be present in method 300, and method 300 may proceed from step 306 to step 312 if personality information associated with an information handling resource is present in personality module 116.

In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media.

Compared with traditional approaches, the methods and systems described above may provide for more efficient customization of information handling resources. For example, using the above-described methods and systems, vendor-specific personality information may be applied to manufacturer-standard information handling resources, without requiring that such manufacturer-standard information handling resources are manually modified to include such vendor-specific personality information. Instead, such information handling resources are configured to determine if personality information for the information handling resources exist in a personality module and, if so, apply such personality information to the information handling resources. Thus, as manufacturer-standard information handling resources are updated, such information handling resources may be delivered to an information handling system without manual addition of vendor-specific personality information, and the information handling resources may automatically apply such vendor-specific identity information.

Additionally, the reduction in manual modifications to vendor-specific personality information may allow for more efficient manufacturing and factory implementation of the information handling systems. For example, as described above, a personality module associated with a vendor-specific information handling system may be used to change various information handling resources (e.g., BIOS 106, baseboard management controller 108, BMC firmware 110, service processor 112, service processor 118, or another information handling resource) of vendor-based information handling systems. Accordingly, a basic version of each of these information handling resources may be installed on different vendor-based information handling systems and the personality module may modify the basic versions of the information handling resources according to the specific vendor settings. Because the same basic versions of information handling resources may be installed on different vendor-specific information handling systems, the part numbers for the information handling resources that are shared by the vendor-specific information handling systems may also be the same. Accordingly, the number of unique information handling resources and part numbers associated with each individual, vendor-specific information handling system may be reduced. In contrast, in traditional implementations, internal systems associated with the vendor-specific information handling system may be somewhat different and may have different part numbers that are unique to the vendor-specific information handling systems with which they are associated. Thus, the personality module may allow for a more simplified and efficient manufacturing process of vendor-specific information handling systems by reducing the number of unique internal systems and associated part numbers of vendor-specific information handling systems.

Figure 4:
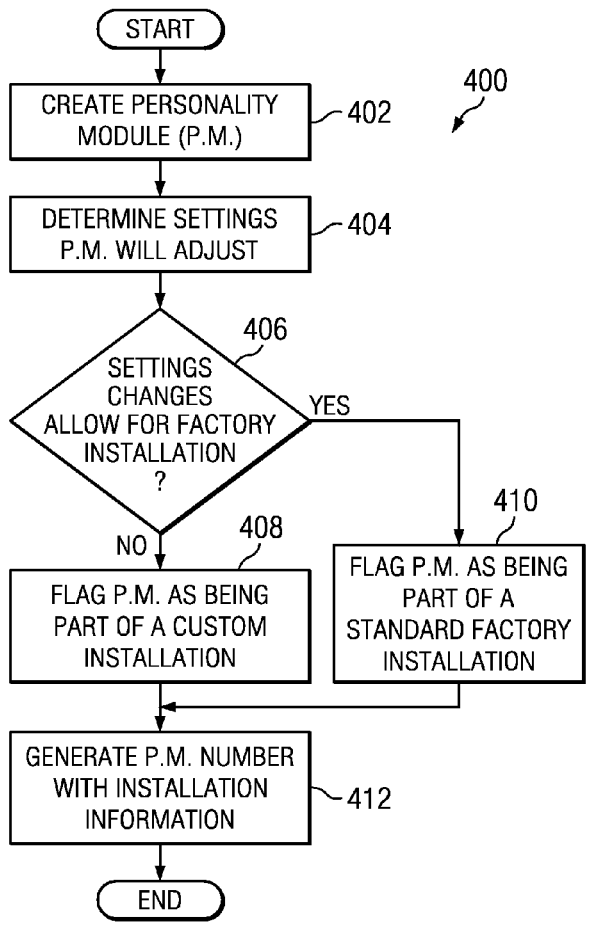
FIG. 4 illustrates a flow chart of an example method for determining whether a personality module for a specific vendor may be implemented using a standard factory install routine or a customized factory install routine, in accordance with embodiments of the present disclosure.
Figure 5:
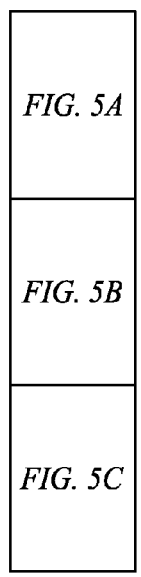
FIGS. 5A, 5B, and 5C (collectively referred herein as "FIG. 5") illustrate an example chart indicating which changes made by a personality module may allow for a standard factory installation of an information handling system and which changes may require a customized installation of the information handling system, in accordance with some embodiments of the present disclosure.
Figure 6:
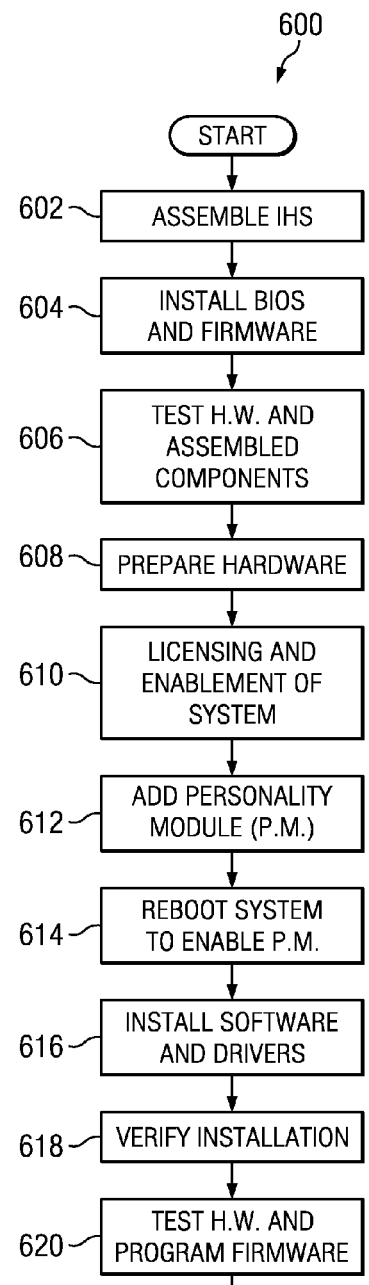
FIG. 6 illustrates a flow chart of an example method for integrating and installing a personality module during a factory installation of an information handling system, in accordance with embodiments of the present disclosure.

FIGS. 4-6 illustrate example methods of integrating a personality module with manufacturing and configuration of an information handling system.

FIG. 4 illustrates a flow chart of an example method 400 for determining whether a personality module for a specific vendor may be implemented using a standard factory install routine or a customized factory install routine, in accordance with embodiments of the present disclosure. According to one embodiment, method 400 may begin at step 402. As noted above, teachings of the present disclosure may be implemented in a variety of configurations of information handling system 100. As such, the preferred initialization point for method 400 and the order of the steps 402-412 comprising method 400 may depend on the implementation chosen. Method 400 may be implemented using any suitable information handling system or any other system operable to implement method 400. In certain embodiments, method 400 may be implemented partially or fully in software and/or firmware embodied in computer-readable media. In the present example, method 400 may be performed in whole or in part by configuration system 120.

At step 402 a personality module 116 may be created for information handling system 100 and at step 404 it may be determined which settings of information handling resources of information handling system 100 may be adjusted by personality module 116. As mentioned above, personality module 116 may be configured to adjust any number of information handling resources of information handling system 100. The adjustment of each setting may impact how information handling system 100 operates and how the information handling resources interact with each other. Some of these changes may result in specific changes in information handling system 100 that may need customization and specific attention during the configuration of information handling system 100. In other instances, the changes made to information handling resources by personality module 116 may result in routine changes that may be handled in a standard manner such that a factory install and configuration information handling system 100 may be used.

In some embodiments of the present disclosure, personality module 116 may be stored in memory 124 of configuration system 120, such that configuration system 120 may load personality module 116 on service processor 112. Additionally, in the same or alternative embodiments, configuration system 120 may determine whether personality module 116 may be associated with a standard installation process or a customized installation process.

FIG. 5 illustrates an example chart indicating which changes made by personality module 116 may allow for a standard factory installation of information handling system 100 and its associated information handling resources and which changes may require a customized installation of information handling system 100 and its associated information handling resources, in accordance with some embodiments of the present disclosure. For example, as indicated by the chart of FIG. 5, modifications to various boot settings (e.g., BIOS boot settings, one time boot settings, etc.) made by personality module 116 may require a customized installation. Additionally, as also indicated by FIG. 5, changes to an integrated network associated with information handling system 100 may require a customized installation. In the present example, the information included in FIG. 5 may be included in a look up table stored in memory 124 of configuration system 120 that may be used by configuration system 120 to determine whether a standard install or a custom install of information handling system 100 may be used. In some embodiments, the look up table may be generated by a system administrator using the criteria shown in the chart of FIG. 5.

It is understood that FIG. 5 is merely an example chart and that other settings not included in the chart may be changed by personality module 116. Additionally, in some instances, some settings indicated as being allowable for a factory installation may be part of a customized installation and vice versa.

Returning to FIG. 4, at step 406, configuration system 120 may determine whether the settings changes (e.g., "personality information") made by personality module 116 to information handling resources of information handling system 100 may allow for a standard factory installation of information handling system 100. This determination may be made by accessing a look up table (e.g., as shown in FIG. 5) stored on configuration system 120 to determine whether the indicated changes allow for a standard factory installation or a customized installation. If the settings changes do allow for standard factory installation, method 400 may proceed to step 410. If the settings do not allow for a standard factory installation (e.g., require a customized installation), method 400 may proceed to step 408.

At step 408, configuration system 120 may flag personality module 408 as being part of a customized installation. At step 412 a part number may be generated for personality module 116 that indicates that information handling system 100 may be configured using a customized installation process based on the flag of step 408.

At step 410, if at step 406 it is determined that the changes made by personality module 116 may allow for a standard factory installation, personality module 116 may be flagged as being part of a standard installation. Accordingly, following step 410 at step 412, a part number may be generated for personality module 116 indicating that information handling system 100 may be configured using a standard installation process based on the flag at step 410. Following step 412, method 400 may end.

Therefore, method 400 may be used to determine whether an information handling system 100 and its associated personality module 116 may be configured using a standard installation process or a customized installation process based on the changes made to information handling system 100 by personality module 116. Also, it is understood that even in instances where a customized installation may be used, personality module 116 may simplify the process by reducing the number of unique information handling resources associated with a specific information handling system 100.

Although FIG. 4 discloses a particular number of steps to be taken with respect to method 400, method 400 may be executed with greater or fewer steps than those depicted in FIG. 4. For example, in some embodiments, step 412 may be associated with step 408 and not step 410, and a separate step similar to step 412 may be used for generating a part number after step 410. Additionally, the order of the steps may change without departing from the scope of the present disclosure. For example, generating the part number associated with personality module 116 may be performed in a different order than indicated.

FIG. 6 illustrates a flow chart of an example method 600 for integrating and installing personality module 116 during a standard factory installation of information handling system 100, in accordance with embodiments of the present disclosure. According to one embodiment, method 600 may begin at step 602. As noted above, teachings of the present disclosure may be implemented in a variety of configurations of information handling system 100. As such, the preferred initialization point for method 600 and the order of the steps 602-620 comprising method 600 may depend on the implementation chosen. Method 600 may be implemented using any suitable information handling system or any other system operable to implement method 600. In certain embodiments, method 600 may be implemented partially or fully in software and/or firmware embodied in computer-readable media. In the present example, method 600 may be performed in whole or in part by configuration system 120.

At step 602, the hardware components of information handling system 100 may be assembled and at step 604 configuration system 120 may install standard information handling resources (e.g., BIOS 106, baseboard management controller 108, BMC firmware 110, service processor 112, service processor 118, or another information handling resource) on information handling system 100. As mentioned above, these resources may be the same and may have standard part numbers regardless of the vendor specificity of information handling system 100 because they may be modified at a later time by a personality module 116 that may be vendor-specific. Accordingly, the number of individual information handling resources and associated part numbers associated with each vendor-specific information handling system may be reduced, thus simplifying the installation and implementation processes of multiple vendor-specific information handling systems 100.

At step 606, the hardware (HW) and assembled components may be tested. For example, memory 104 and/or memory 114 may be written to and read from to determine whether the memory is good. Additionally, other tests and verifications may be done to ensure that processor 103, BMC 108, BIOS 106, service processor 112, and any other components of information handling system 100 are operating correctly.

At step 608 configuration system 120 may prepare a hard drive associated with information handling system 100. For example, in some instances an operating system one or more drivers associated with information handling system 100 and/or one or more software applications may be overlaid on the hard drive.

At step 610, configuration system 120 may enable or disable information handling resources associated with information handling system 100 depending on the licensing of operation and use of those resources by information handling system 100. Accordingly, upon completing step 610, a base platform for information handling system 100 may be assembled and configured regardless of a vendor-specific nature of information handling system 100.

At step 612, personality module 116 may be added to information handling system 100 and at step 614, configuration system 120 may reboot information handling system 100 to enable and execute personality module 116. Accordingly, at step 614 personality module 116 may change one or more information handling resources to customize information handling system 100 according to the particular vendor of which it is associated. In other instances where information handling system 100 may not be a vendor-specific system, personality module 116 may not be installed at step 612 or may be configured to maintain the default settings of the information handling resources of information handling system 100.

For example, in the licensing stage described at step 610, a standard original equipment manufacture (OEM) license may be applied to enable a default set of resources associated with information handling system 100. In some instances, personality module 116 may include licensing information that may enable or disable resources not enabled or disabled according to the standard OEM license, such that personality module 116 may customize the licensing of information handling system 100 away from the standard OEM license. In other instances, personality module 116 may not change the licensing such that the standard OEM license may be used for information handling system 100.

At step 616, the software overlaid on the hard drive at step 608 (e.g., the operating system, drivers, etc.) may be installed onto information handling system 100. In some instances, this step may occur after personality module 116 modifies one or more information handling resources at step 614 to ensure that modifications made by personality module 116 do not disrupt the operation of the operating system. For example, personality module 116 may modify a memory field or pointer used by the operating system, therefore by changing the field before installing the operating system, the operating system may use the modified settings during installation.

At step 618 the installation of the software (e.g., operating system, drivers, etc.) may be verified and at step 620 the system (e.g., hardware, software) may be tested together to verify proper operation of information handling system 100. For example, an configuration system 120 may take an electronic inventory of information handling system 100 and may retest all the hardware components similar to as done in step 606. Following step 620, information handling system 100 may be ready for use and method 600 may end.

Therefore, method 600 may be used to integrate and install personality module 116 with information handling system 100 in such a manner as to customize information handling system 100 (if desired) without disrupting the operation of information handling system 100.

Although FIG. 6 discloses a particular number of steps to be taken with respect to method 600, method 600 may be executed with greater or fewer steps than those depicted in FIG. 6. Additionally, the order of the steps may change without departing from the scope of the present disclosure. Further, although method 600 is described in the context of a standard factory installation of information handling system 100, one or more steps (e.g., the personality module installation and execution at steps 612 and 614 and the subsequent software installation at step 616) may be used during a customized installation of information handling system 100. Additionally, it is understood that configuration system 120 may include other components and systems that may be used to perform other steps associated with configuring information handling system 100. For example, configuration system 100 may include physical components used to assemble the hardware components of information handling system 100 in addition to being configured to configure software and firmware of information handling system 100.

Although the present disclosure has been described in detail, it should be understood that various changes, substitutions, and alterations can be made hereto without departing from the spirit and the scope of the disclosure as defined by the appended claims. For example, in some embodiments a configuration system 120 may be used to perform the steps of method 400 and another configuration system 120 may be used to perform the steps of method 600.

What is claimed is:

1. A method of configuring an information handling system comprising:
    configuring a base platform of an information handling system;
    installing a personality module on the base platform, the personality module configured to store personality information associated with an information handling resource of the information handling system;
    executing the personality module; and
    installing software associated with the information handling system after executing the personality module,
    wherein the information handling resource is selected from at least one of: a baseboard management controller (BMC) and a service processor.

2. The method of claim 1, wherein executing the personality module further comprises:
    determining if personality information is present on the personality module;
    modifying the information handling resource to include the personality information, in response to determining that personality information is present on the personality module; and
    executing the information handling resource as modified with the personality information.

3. The method of claim 2, further comprising installing the personality module in a customized configuration process of the information handling system if the personality information requires the customized configuration of the information handling system.

4. The method of claim 3, wherein personality information that requires the customized configuration of the information handling system comprises at least one of modified boot settings and integrated network settings.

5. The method of claim 1, wherein:
    configuring the base platform comprises applying a standard original equipment manufacturer (OEM) license to the information handling resource; and
    the personality information modifies the OEM license as applied to the information handling resource.

6. The method of claim 1, wherein the information handling resource is associated with a part number that is the same for a first vendor-specific information handling system and a second vendor-specific information handling system.

7. The method of claim 1, wherein the personality information includes at least one vendor-specific customization associated with a vendor of the information handling system, the vendor-specific customizations for modifying at least one manufacturer-specific configuration associated with a manufacturer of the information handling system.

8. The method of claim 7, wherein the at least one vendor-specific customization comprises branding information associated with the vendor, and the method further comprising modifying the information handling resource or the second information handling resource such that information handling resource displays to a display device associated with the information handling system the branding information.

9. The method of claim 1, wherein the base platform is the same for a first vendor-specific information handling system and a second vendor-specific information handling system.

10. The method of claim 1, wherein the software comprises an operating system.

11. The method of claim 1, wherein the software comprises a driver.

12. A system comprising:
    a processor;
    a computer readable medium; and
    computer-executable instructions carried on the computer readable medium, the instructions readable by the processor and, when executed, for causing the processor to:
    configure a base platform of an information handling system;
    install a personality module on the base platform, the personality module configured to store personality information associated with an information handling resource of the information handling system;
    execute the personality module; and
    install software associated with the information handling system after executing the personality module,
    wherein the information handling resource is selected from at least one of: a baseboard management controller (BMC) and a service processor.

13. The system of claim 12, wherein executing the personality module further comprises:
    determining if personality information is present on the personality module;
    modifying the information handling resource to include the personality information, in response to determining that personality information is present on the personality module; and
    executing the information handling resource as modified with the personality information.

14. The system of claim 12, wherein:
    configuring the base platform comprises applying a standard original equipment manufacturer (OEM) license to the information handling resource; and
    the personality information modifies the OEM license as applied to the information handling resource.

15. The system of claim 12, wherein the information handling resource is associated with a part number that is the same for a first vendor-specific information handling system and a second vendor-specific information handling system.

16. The system of claim 12, wherein the personality information includes at least one vendor-specific customization associated with a vendor of the information handling system, the vendor-specific customizations for modifying at least one manufacturer-specific configuration associated with a manufacturer of the information handling system.

17. The system of claim 16, wherein the at least one vendor-specific customization comprises branding information associated with the vendor, and the method further comprising modifying the information handling resource or the second information handling resource such that information handling resource displays to a display device associated with the information handling system the branding information.

18. The system of claim 12, wherein the base platform is the same for a first vendor-specific information handling system and a second vendor-specific information handling system.

19. A configuration system:
a processor; and
a computer readable medium accessible to the processor and storing computer-executable instructions, the instructions executable by the processor to:
configure a base platform of an information handling system;
install a personality module for the base platform on the information handling system, the personality module including personality information associated with a first information handling resource, a second information handling resource, and a third information handling resource of the information handling system;
cause the personality module to be executed on the information handling system; and
install software on the information handling system after executing the personality module,
wherein the first information handling resource is a Basic Input/Output System (BIOS),
wherein the second information handling resource is a baseboard management controller (BMC), and
wherein the third information handling resource is a service processor.

* * * * *